United States Patent [19]

Bernstein

[11] 4,133,028

[45] Jan. 2, 1979

[54] DATA PROCESSING SYSTEM HAVING A CPU REGISTER FILE AND A MEMORY ADDRESS REGISTER SEPARATE THEREFROM

[75] Inventor: David H. Bernstein, Ashland, Mass.

[73] Assignee: Data General Corporation, Westboro, Mass.

[21] Appl. No.: 728,836

[22] Filed: Oct. 1, 1976

[51] Int. Cl.² ............................................. G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,564,227 | 2/1971 | Bowers | 364/200 |
| 3,573,852 | 4/1971 | Watson et al. | 364/200 |
| 3,984,670 | 10/1976 | Erickson et al. | 364/200 |
| 3,988,717 | 10/1976 | Kisylia | 364/200 |
| 3,990,052 | 11/1976 | Gruner | 364/200 |
| 3,997,771 | 12/1976 | Perlowski et al. | 364/900 X |
| 3,999,052 | 12/1976 | Gooding | 364/200 X |
| 4,008,462 | 2/1977 | Kanda | 364/200 |
| 4,014,006 | 3/1977 | Sorensen et al. | 364/200 |
| 4,025,904 | 5/1977 | Adney et al. | 364/200 |
| 4,037,213 | 7/1977 | Atkins et al. | 364/200 |
| 4,040,028 | 8/1977 | Pauker et al. | 364/200 |
| 4,045,782 | 8/1977 | Anderson et al. | 364/200 |
| 4,053,944 | 10/1977 | Dixon | 364/200 |

Primary Examiner—Melvin B. Chapnick
Attorney, Agent, or Firm—Robert F. O'Connell

[57] ABSTRACT

A data processing system having a particular configuration of interconnecting data paths among the data handling units thereof. The central processor unit of the system includes a skew-protected quadriport register file having two read and two write input ports as well as a separately located instruction register and a separately located memory address register. The first read port is connected to one of a pair of inputs to an arithmetic-logic unit and the second read port is connected to the other one of the pair of inputs to the arithmetic-logic unit and to the first write port of the register file. The output of the arithmetic-logic unit is connected to the memory address register and to a shifter unit, the shifted output thereupon being connected to the second write port of the register file. The system uses two separate buses for transferring data between the central processor unit and memory units and between the central processor unit and external input/output devices. A separate memory address unit transfers addresses from the memory address register to the memory units.

6 Claims, 6 Drawing Figures

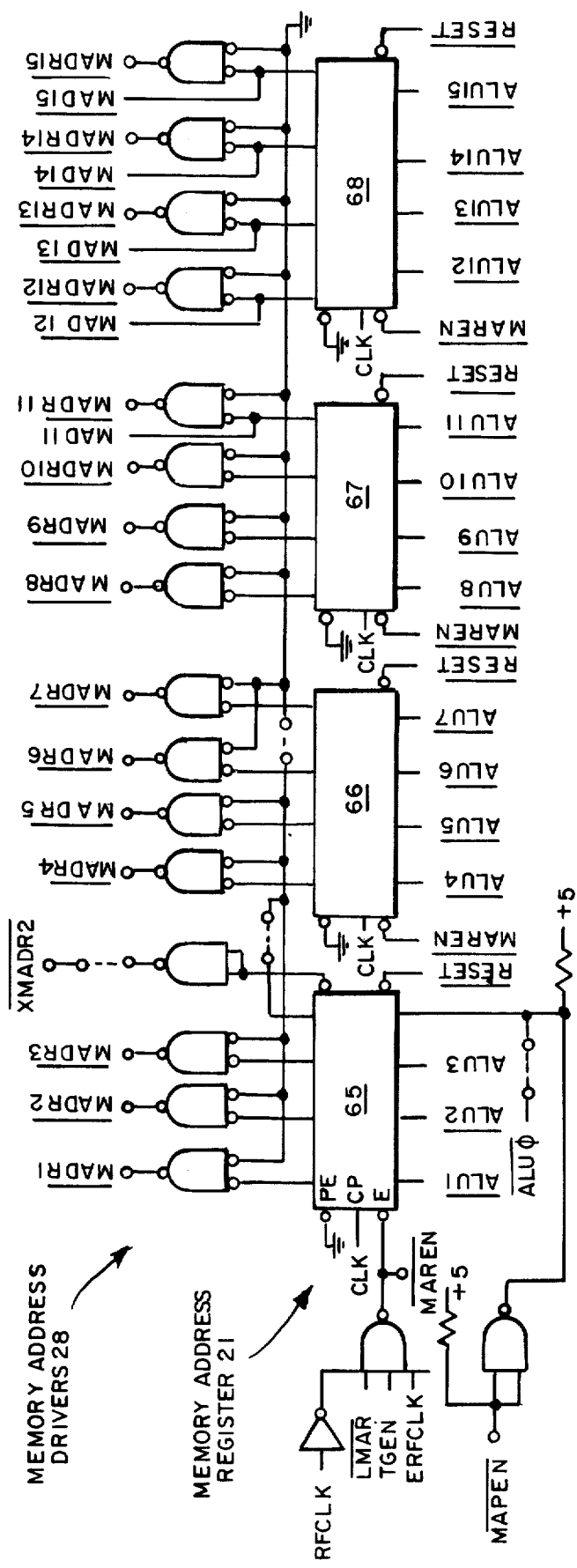
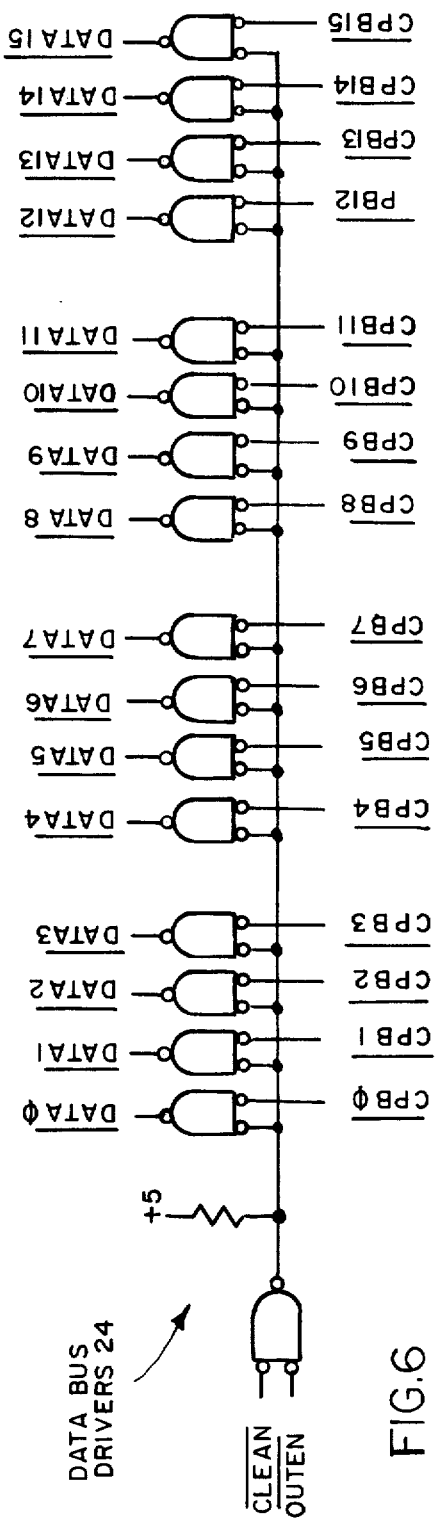
FIG.5
FIG.6

DATA PROCESSING SYSTEM HAVING A CPU REGISTER FILE AND A MEMORY ADDRESS REGISTER SEPARATE THEREFROM

INTRODUCTION

This invention relates generally to data processing systems and, more particularly, to data processing systems using a unique configuration of interconnecting data paths among the data handling units thereof.

BACKGROUND OF THE INVENTION

A data processing system operating asynchronously with one or more memory units has been described in the previously filed U.S. Pat. application Ser. No. 387,523, filed Aug. 10, 1973, now abandoned, refiled as continuation application Ser. No. 646,351 on Jan. 2, 1976 by Sorensen et al. and assigned to the same assignee as this application now issued as U.S. Pat. No. 4,014,006 on Mar. 22, 1977, such previously filed applications being hereby incorporated by reference in this application. In the previously described system, a single common bidirectional data and memory bus was used for data transfers among the memory units, the central processor unit (CPU) and the inut/output (I/O) units. Moreover, the unique data path configuration described therein was devised to interconnect a CPU register file, which register file included a memory address register (MA), with an arithmetic logic unit (ALU), a shifter unit, a separately connected instruction register (IR) and the common bus to provide an optimization of the data transfers among such units and the memory units, thereby improving the overall processing time during many operations. In accordance therewith the system took advantage of the use of an available skew-protected, tri-state, quadriport register file, having its read and write ports uniquely connected to the associated units and to the single data/memory bus and the memory address bus (MADR) so as to provide the desired optimum operation within the operating constraints of the register file.

While the structure and operation of such previously described system has found widespread and effective use in many applications, in many cases it is desirable to improve such operation even further by providing quicker access to addresses in the memory units than is provided in such previous system and to avoid the data transfer constraints imposed by the use of a single common data/memory bus.

SUMMARY OF THE INVENTION

While this invention makes use of the general architecture of the above-referenced previously described system, important changes have been made therein to improve the overall operation thereof. Thus, the system of the invention utilizes separate data and memory buses. Further, the memory address register has been removed from the register file and is located separately therefrom for separate connection to the ALU and the memory address bus, so that the overall data path configuration of interconnections among the CPU register file, the ALU, the now separately connected memory address register, the separately connected instruction register, and the separate data, memory and address buses has been suitably designed in order to optimize the data transfers in accordance with such modifications. The memory address register is accessed from the arithmetic logic unit, a desired address being placed in the address register one operating time cycle prior to the time cycle in which the address is to be used, so that in such subsequent time cycle the address is immediately available without the necessity for obtaining access thereto in the register file. Further, in the register file, the register previously used for memory addresses thereby becomes available for other uses so that together with the two temporary registers available in the previously described system, three such registers are now available for use to provide for the implementation of a greater number of processing instructions. For example, it is now possible to utilize more powerful memory handling techniques, such as by using well-known memory stacking techniques, two of the available registers in the register file now being useful in providing stack pointer and frame pointer information in accordance therewith. Such data path configuration in accordance with the present invention is described in more detail with the help of the accompanying drawings wherein FIG. 1 shows a block diagram of the interconnections between a central processor unit, memory units and input/output units of a typical system in which the system of the invention can be used;

FIG. 5 shows more detailed logic circuitry of the memory address register and memory address bus driver units of FIG. 2; and FIG. 6 shows more detailed logic circuitry of the data bus driver units of FIG. 2.

DESCRIPTION OF THE INVENTION

Figure 1:
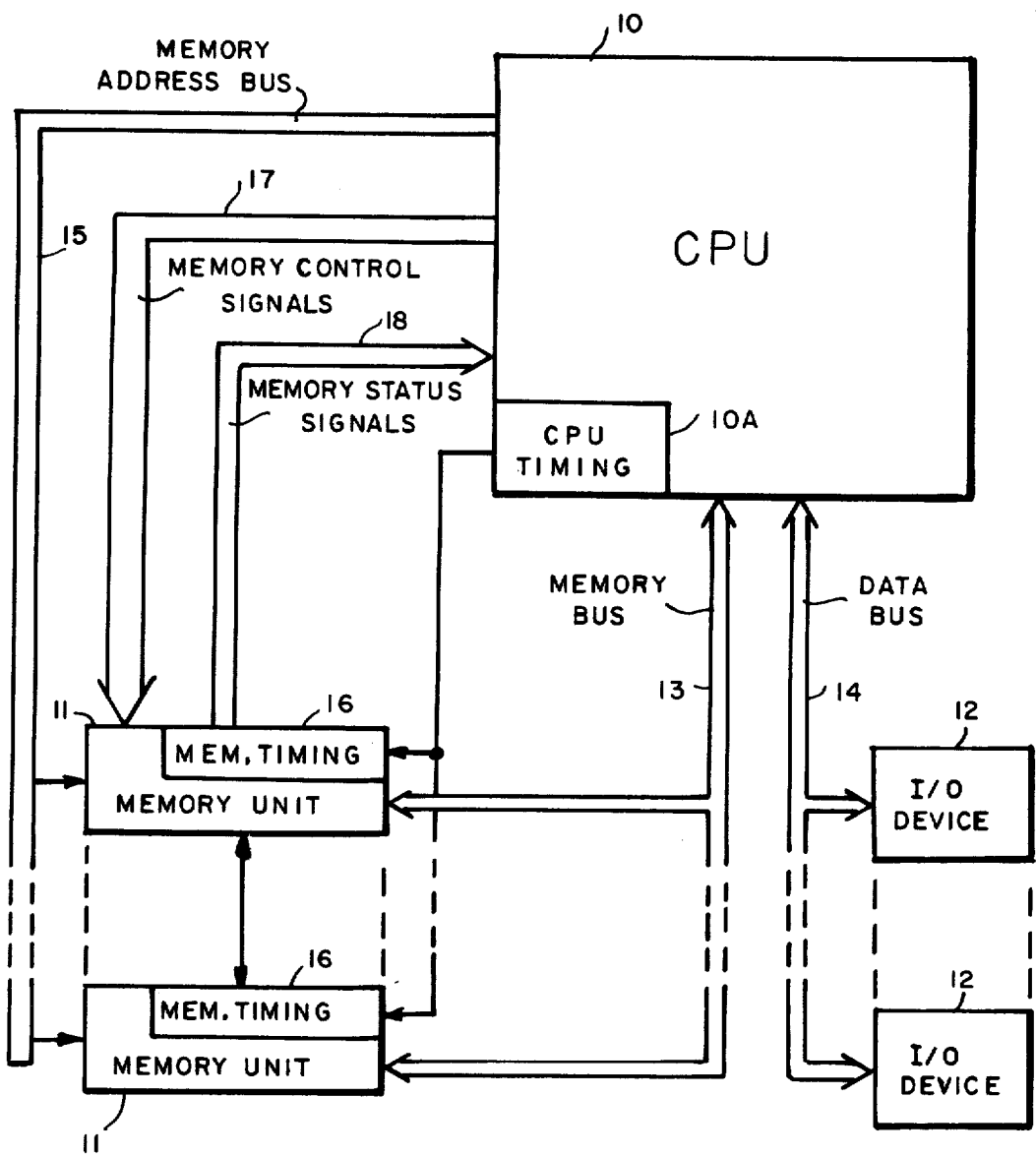

As can be seen in the broad block diagram of FIG. 1, the data processing system of the invention includes a central processing unit 10, one or more memory units 11 each including a plurality of suitable memory devices, and one or more I/O devices 12. A first bus 13 identified as the "Memory" bus provides for bi-directional transfer of data among the memory uits and the CPU 10. A second bus 14 separate from bus 13 identified as the "Data" bus provides for bi-directional data transfer among the I/O devices 12 and the CPU 10. A separate "Memory Address" bus 15 provides for the transfer of memory addresses from the CPU 10 to the memory units 11.

Suitable timing circuitry 10A, not forming a specific part of the invention, is utilized in the CPU 10 to provide one or more appropriate CPU timing signals for producing the required timing of the operation thereof and the required timing of the operation of the memory units 11 via suitable connections to an appropriate memory timing circuit 16 associated with each of the memory units 11. The timing circuitry design is well within the skill of those in the art and need not be disclosed in more detail here since it does not form the inventive portion of the overall data processing system which is herein described. An exemplary timing system, for example, is discussed in the aforementioned previously described issued patent of Sorensen et al. wherein the central processor timing signal and the memory timing signal have a predetermined out-of-phase relationship. Such timing system may be utilized, although other timing systems wherein the central processor timing signals and the memory timing signals, for example, have a predetermined in-phase relationship may also be used.

A plurality of additional separate interconnections between CPU 10 and memory units 11 can be used for separately transferring designated operating instructions, such signals being of the type, for example, as described in the aforementioned Sorensen et al. issued patent, for controlling the memory, i.e., the memory control signals 17, and for indicating the status of the memories, i.e., the memory status signals 18. Accordingly, since such signals do not form a part of the specific invention described herein no further detailed description thereof is required here.

The system of FIG. 1 and the data path configuration of the invention shown therein can be described with particular reference to, and as a modification of, a presently existing line of data processing apparatus now being sold under the designation of Nova-line computers by Data General Corporation of Southboro, Massachusetts, for example. Reference is thereby also made to the system reference manual for such computers entitled "How to Use the Nova Computers", published and available from Data General Corporation.

The Nova-line computers are general purpose computer systems with a 16-bit word length. Such machines are organized around four accumulators, two of which can be used as index registers. An Nova-line computer can have both alterable memory and read-only memory (ROM) and further may have either a programmer's console or a turn-key console that has a minimum of controls. The CPU is the control unit for the entire system and governs all peripheral I/O equipment, performs all arithmetic, logical, and data handling operations, and sequences the program. The processor handles words of 16 bits which are stored in an appropriate memory, the bits of a word being numbered 0–15, left to right, as are the bits in the registers that handle the words. Words are used as either computer instructions in a program, as addresses, or as operands, (i.e., as data for the program). The program can interpret an operand as a logical word, an address, a pair of 8-bit bytes, or a 16-digit signed or unsigned binary number.

In the CPU of the system shown in the aforementioned Sorensen et al. issued patent, for example, a portion of the CPU included a register file which comprised eight registers including the four accumulator registers discussed above (AC0, AC1, AC2 and AC3), a 15-bit program counter register (PC), a memory address register (MA) and two temporary registers for temporarily storing data (TEMP 1 and TEMP 2). A separate instruction register (IR) was located outside of and independent of the register file since its contents are constantly required by the central logic.

Figure 2:
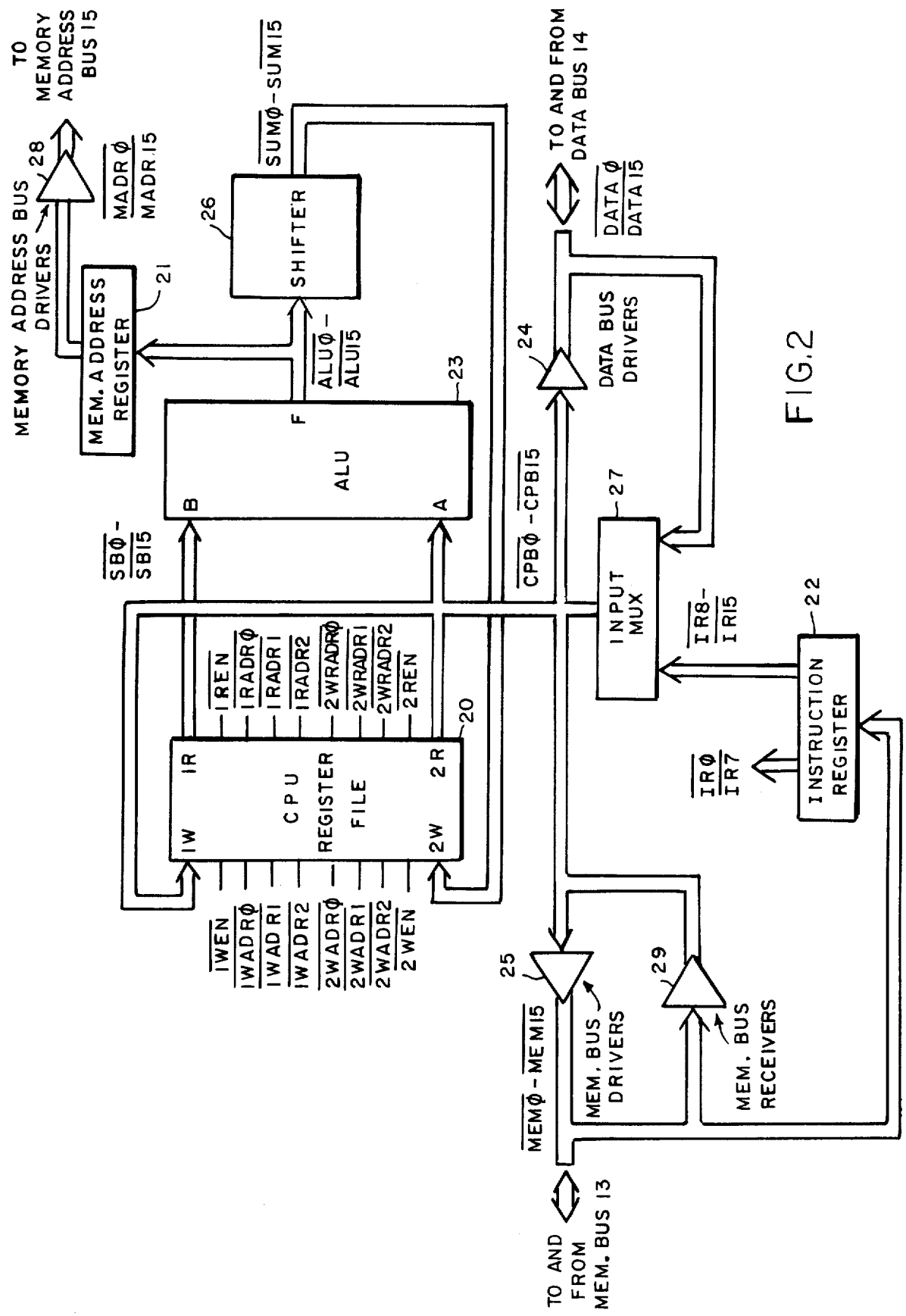
FIG. 2 shows a block diagram of the data path interconnections among the register file, the arithmetic logic unit, the shifter unit and the instruction and memory address units of the central processor unit and the data transfer paths with reference to the memory, data, and memory address buses in accordance with the invention.

As shown in FIG. 2, the system of the invention also includes such a register file 20 having eight registers including the same four accumulator registers (AC0 – AC3), the 15-bit counter register (PC), and three temporary registers (TEMP 1, TEMP 2, TEMP 3) which may be used for whatever purpose is desired, for example, depending on the memory handling techniques being used. For example, when implementing a stack memory architecture, which requires stack and frame information, as is well known to those in the art, two of the temporary registers can be so used for such purposes and can be designated, for example, as a stack pointer register (SP) and a frame pointer register (FP), leaving one remaining temporary register (TEMP) for use in temporarily storing data in the register file. The memory address register (MAR) is now no longer located in the register file but is independently and separately located outside thereof and connected as discussed below, as is the instruction register (IR) 22, as shown in FIG. 2.

The register file 20 has two write input ports (1W and 2W) and two read output ports (1R and 2R). To eliminate the need for an external buffer register, the register file is skew protected, i.e., its write operation occurs on the edge of a clock pulse, as discussed above with reference to the aforementioned Sorensen et al. issued patent. With skew protection it is possible to read from and write into the same register in the same processor cycle because the actual write operation occurs at the end of the cycle. Since simultaneous read access to two registers is frequently necessary, e.g., the source accumulator and destination accumulator must both be accessed in a dual-operand arithmetic logic class instruction, the register file should have two read ports in order to avoid the need for duplicate register files. Furthermore, the dual read ports coupled with the internal addressing logic of the register file eliminate the need for multiplexer units at the read output of the register file, provided the output of the register file is either tri-state or open-collector. Since the output of the arithmetic logic unit (ALU) 23 is constrained by the instruction-fetch cycle to source port 2W, this port must address the destination accumulator during arithmetic logic control execution, which operation constrains the 2R port also to address the destination accumulator. Therefore, the 1R port must address the source accumulator and must be connected to the B-input of the ALU 23. The arrangement of FIG. 2 meets the above constraints and the use of dual write ports accordingly eliminates the need for multiplexers at the write input of the register file since no processor cycle occurs in which more than two registers are written with data from the same source.

A skew-protected, tri-state quadriport register 20 of the type discussed above is available under the Model designation No. 74172 from Texas Instruments Company, Dallas, Texas. In such unit ports 2R and 2W share common addressing controls. The assignment of physical ports to the data path shown in FIG. 2 produces optimal operation under the operating constraints of such register. In addition, the following constraint on the data path configuration is imposed by the instruction-fetch cycle of the data processing system of the invention:

PC+1 → PC, and memory address register (MAR), transfers force the write port source by the ALU output to address the PC register.

Unlike the data path configuration of the above referenced Sorensen et al. issued patent, because the memory address register is no longer a part of the register file, no constraint is imposed which would force a read port to source the memory address bus. Port 2W must address the PC register because it shares addressing control with port 2R. The 1R output port is fixedly connected to the B-input of the ALU 23 but, unlike the previously described configuration of the above referenced Sorensen et al. issued patent, is not connected to the memory address bus 15. The 2R output port is connected to the A-input of the ALU 23 and is further connected to the 1W input and to the data bus and memory bus amplifier driver units 24 and 25, respectively, and to the memory bus receiver unit 29. The output of the ALU 23 is appropriately fed to a shifter unit 26, the output of which is fixedly connected to the 2W port of the register file 20, and to the memory address register 21. The 1W input port is also connected to the memory and data buses 13 and 14 via an input multiplexer 27. Thus, the 1W input can be fed either from the 2R output of the register file 20, from an external I/O device directly via the data bus 14, or from the memory units via the memory bus 13, depending on the operation being performed.

The memory address register (MAR) 21 is supplied from the ALU 23, the desired address being placed in the MAR during an operating time cycle prior to the operating time cycle in which such address is required, e.g., in some instances one cycle ahead of the desired cycle and in other instances more than one cycle ahead. At the subsequent desired time cycle the address is, therefore, immediately available and can be placed on the memory address bus 15 via the memory address bus driver units 28.

Figure 3:
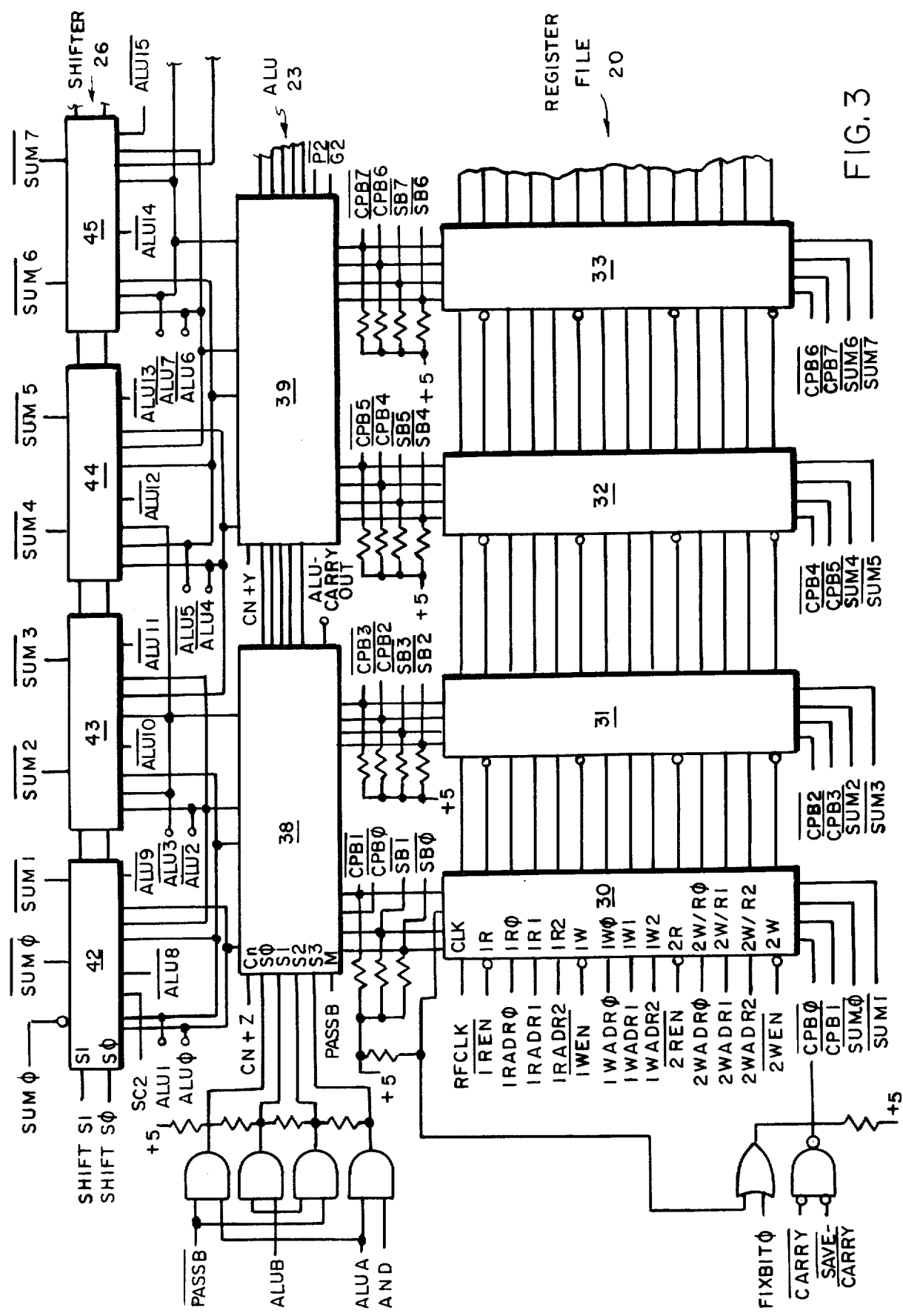
FIGS. 3 and 3A show more detailed logic circuitry of the register file, arithmetic logic unit and shifter unit of FIG. 2.
Figure 3A:
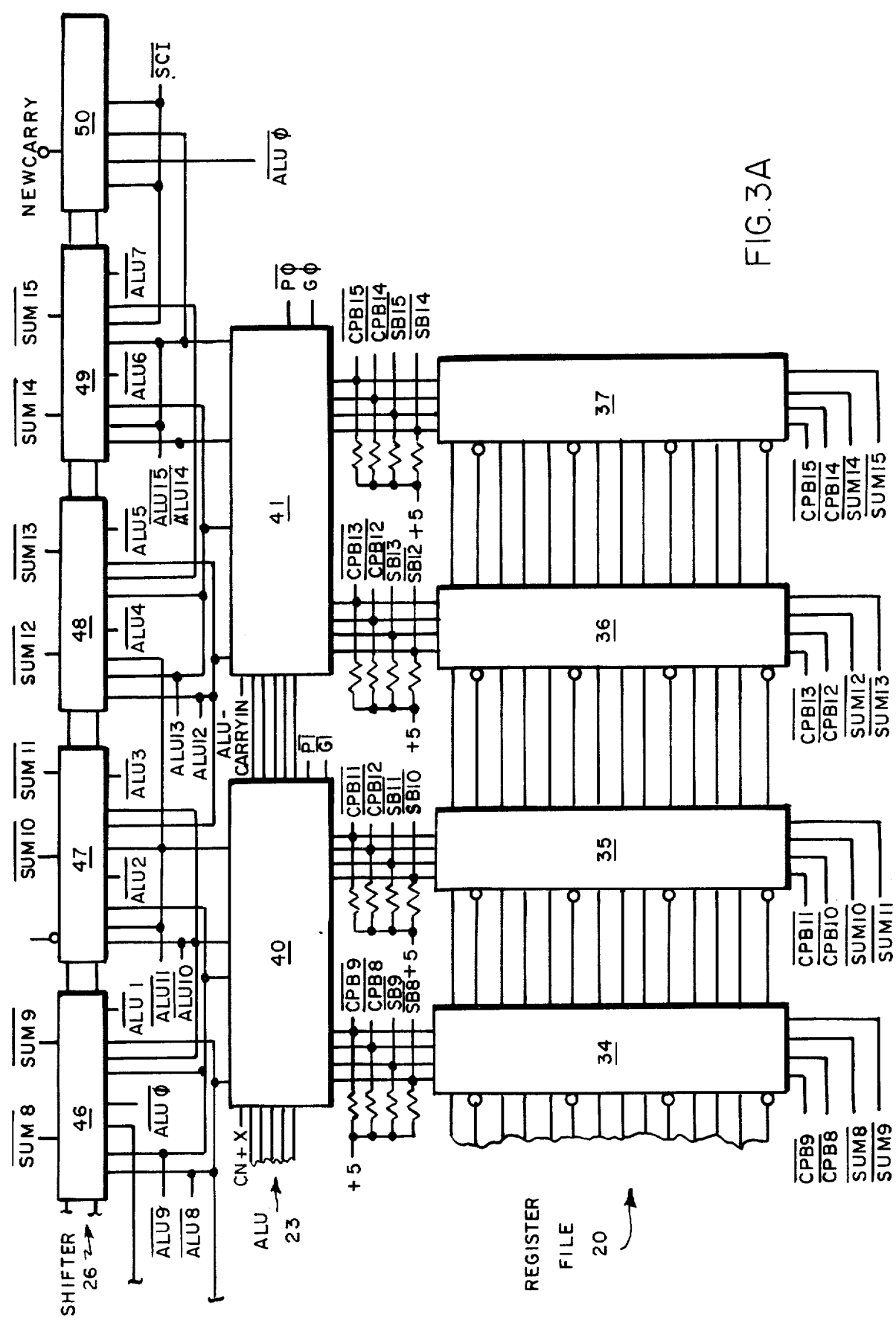

More detailed block diagrams of the register file 20, the ALU 23 and the shifter 26 and their interconnections are shown in FIGS. 3 and 3A, which figures if placed side by side show a complete connecting diagram thereof. As seen therein, when handling 16-bit words, as in the particular embodiment of the invention described here, such units preferably can be formed as appropriate integrated circuitry. Thus, in FIGS. 3 and 3A, with respect to register file 20, eight integrated circuits of the above-mentioned Model designation No. 74172, or its equivalent, can be used, each circuit handling 2 bits of the 16 bits involved. Thus, eight register file integrated circuit units 30–37 are required, each having 13 input control signals for addressing the register file and for enabling the read and write ports (the 1RADR0-2, 1WADR0-2, 2WRADR0-2 signals and the $\overline{1REN}$, $\overline{2REN}$, $\overline{1WEN}$ and $\overline{2WEN}$ signals). The read and write ports include the 1R ports ($\overline{SB0}$–$\overline{SB15}$) connected to the B-input ports of the four ALU integrated circuit units 38–41, the 2R and 1W ports ($\overline{CPB0}$–$\overline{CPB15}$) which are interconnected and which are further connected to the A-input ports of the ALU integrated circuit units 38–41, to the memory bus driver units 25, to the memory bus receiver units 29, the data bus driver units 24, and the input multiplexer 27 (see FIGS. 4 and 6), and the 2W ports ($\overline{SUM0}$–$\overline{SUM15}$) connected to the outputs of the eight integrated circuit shifter units 42–49. As seen in FIGS. 3 and 3A, the ALU integrated circuit units each handle 4 bits so that four of such units are utilized. Such units may be the type made under Model designation No. 74181 by Texas Instruments Company of Dallas, Texas, or its equivalent. The shifter integrated circuit units each handle 2 bits so that eight of such units are utilized in addition to a carry shifter unit 50 as shown. Such units may be of the type made under Model designation No. 9309 by Fairchild Semiconductor Company, Inc., Mountain View, California, or its equivalent.

Figure 4:
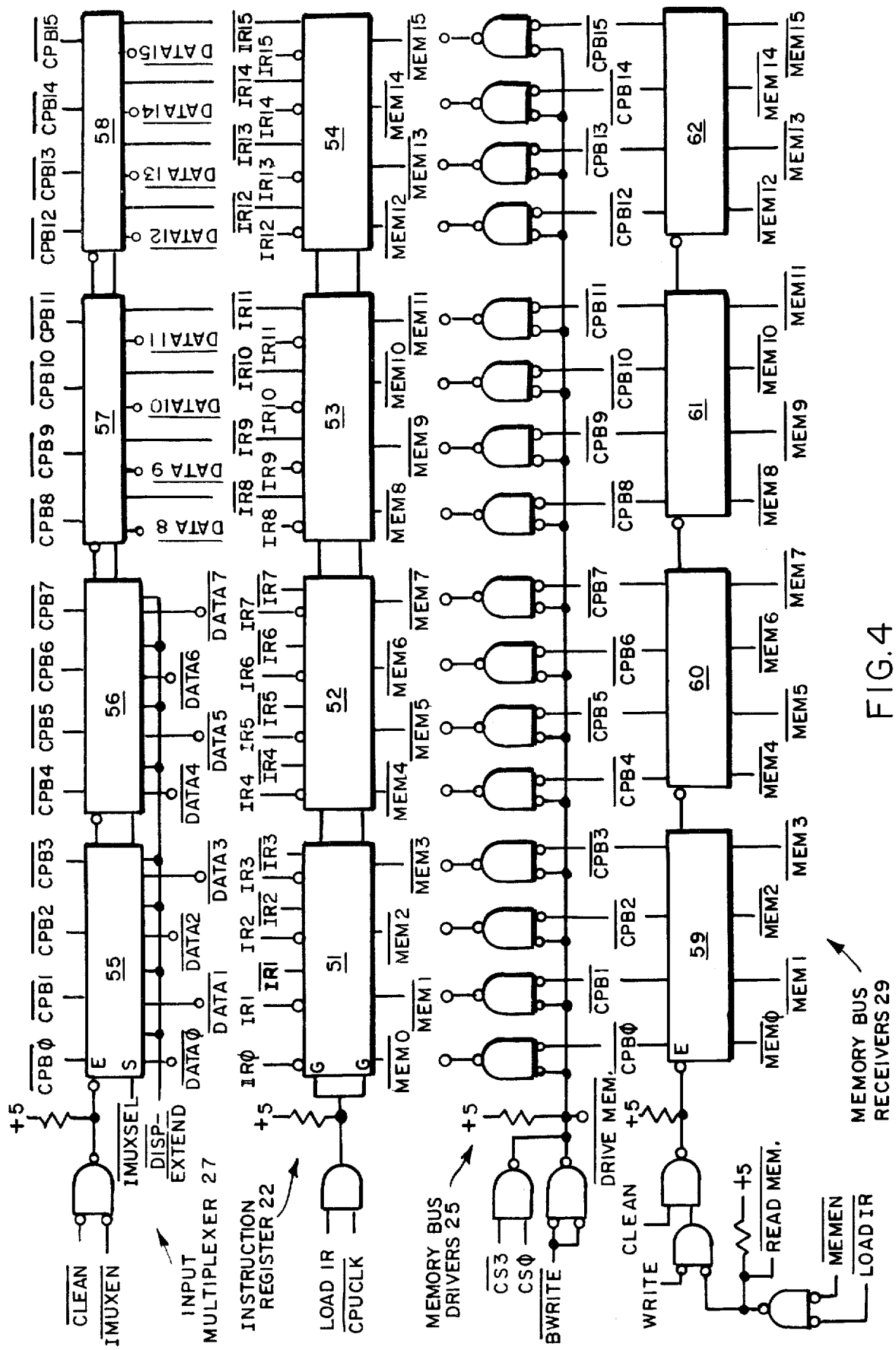
FIG. 4 shows more detailed logic circuitry of the instruction register, the input multiplexer and the memory bus driver units of FIG. 2.

FIG. 4 shows the instruction register 22 which utilizes four integrated circuit units 51–54 each handling four of the input memory data bits ($\overline{MEM0}$–$\overline{MEM15}$) from the memory bus 13 for supplying the instruction register bits ($\overline{IR0}$–$\overline{IR15}$) of which bits ($\overline{IR8}$–$\overline{IR15}$) are supplied to the input multiplexer 27. Integrated circuit units 51–54 may be, for example, of the type sold under the designation Model No. 7475 made by Texas Instruments Company, Dallas, Texas, or its equivalent.

The input muliplexer 27 utilizes four integrated circuit units 55–58 each handling 8 bits, units 57 and 58 each handling four of the eight instruction register bits supplied thereto as well as data bits ($\overline{DATA8}$–$\overline{DATA15}$), while units 55 and 56 handle the remaining data bits ($\overline{DATA0}$–$\overline{DATA7}$), as shown. The input multiplexer outputs are connected to the ports 1W and 2R of the register file, the A-input of ALU 23, the memory bus driver units 25, the memory bus receiver units 29, and the data driver unit 24 (as shown in FIG. 2), such input multiplexer outputs being identified by the designations $\overline{CPB0}$–$\overline{CPB15}$. Accordingly, such common terminal connections are similarly shown in FIG. 4 at the inputs to the memory bus driver unit 25 and the output of the memory bus receiver unit 29. Unit 25 can be implemented by the use of the eight integrated circuit elements of the type, for example, sold under the designation Model No. 0627 by Data General Corporation, Southboro, Massachusetts, or its equivalent, while units 27 and 29 can be implemented by the use of the four integrated circuit elements 59–62, each handling 4 bits, such elements being, for example, of the type sold under the designation Model No. 74S257 by Texas Instruments Company, Dallas, Texas, or its equivalent.

The memory address register 21 shown in FIG. 5 can be implemented by the four integrated circuit elements 65–68, each of which handles 4 bits of the ALU output bit ($\overline{ALU0}$–$\overline{ALU15}$). Such elements can be of the type sold under the designation Model No. 93H72 by Fairchild Semiconductor Company, Inc. of Mountain View, California, or its equivalent, and supply the memory address driver units 28 which are in turn connected to the memory address bus 15, the driver units being of the same types, for example, as those used for the memory bus driver units 25 as discussed above.

The data driver unit 24 shown in FIG. 6 has its inputs connected at the $\overline{CPB}$ common terminal connection and can be implemented in the same manner as the memory bus driver units 25 as discussed above.

What is claimed is:

1. A data processing system comprising a central processor unit for processing address words and data words and one or more memory units for storing address words and data words, said central processor unit including a skew protected quadriport register file having first and second read ports and first and second write ports;

an arithmetic-logic unit for performing arithmetic and logical operations on input information supplied thereto and having a pair of inputs, and an outut;

a shifter unit for supplying a shifted output therefrom to said register file and having an input and an output;

the first read port of said register file connected to one of said pair of inputs of said arithmetic-logic unit;

the second read port of said register file connected to the other of said pair of inputs of said arithmetic-logic unit and to the first write port of said register file; and a memory address register separate from said register file for supplying addresses to said one or more memory units;

the output of said arithmetic-logic unit being connected to the input of said memory address register and to the input of said shifter unit, the output of said shifter unit being connected to the second write port of said register file for writing the shifted logic unit result into the register file.

2. A data processing system in accordance with claim 1 wherein said register file comprises eight registers including four accumulator registers, a program counter register, and at least three additional temporary storage registers; and means for accessing said registers via the first and second read and write ports of said register file.

3. A data processor in accordance with claim 2 wherein the second read port and first write port of said register file are connected to a memory bus driver unit for supplying data from said register file to said one or more memory units and to a memory bus receiver unit for supplying data from said one or more memory units to said register file.

4. A data processing system in accordance with claim 3, said system further including one or more input/output devices and further wherein the first write port and the second read port of said register file are connected to a data driver unit for supplying data to said one or more input/output devices.

5. A data processing system in accordance with claim 4, said central processor unit further including an instruction register supplying a plurality of output bits; and an input multiplexer unit responsive to a plurality of input bits, a first portion of said plurality of input bits to said multiplexer unit being supplied from a portion of said plurality of output bits from said instruction register and a second portion of said plurality of input bits to said multiplexer unit being supplied from said one or more input/output devices, the output of said muliplexer unit being connected to the first write port and the second read port of said register file.

6. A system in accordance with claim 5 and further including a memory bus, said memory bus driver unit and said memory bus receiver unit being connected to said memory bus for transferring data between said central processor unit and said one or more memory units;

a data bus separate from said memory bus, said data driver unit and said input multiplexer unit being connected to said data bus for transferring data between said central processor unit and said one or more input/output devices;

a memory address driver unit connected to said memory address register; and a memory address bus, the output of said memory address driver unit being connected to said memory address bus for transferring addresses from said central processor unit to said one or more memory units.

* * * * *